United States Patent
Girard et al.

(10) Patent No.: US 12,005,884 B2
(45) Date of Patent: Jun. 11, 2024

(54) METHOD FOR OPTIMISING THE TIME GRADIENT OF THE PRESSURE INCREASE IN AN INJECTION SYSTEM OF A HYBRID MOTOR VEHICLE

(71) Applicant: VITESCO TECHNOLOGIES GmbH, Regensburg (DE)

(72) Inventors: Nicolas Girard, Toulouse (FR); Fabien Constans, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 268 days.

(21) Appl. No.: 17/640,757

(22) PCT Filed: Nov. 9, 2020

(86) PCT No.: PCT/EP2020/081514
§ 371 (c)(1),
(2) Date: Mar. 4, 2022

(87) PCT Pub. No.: WO2021/094260
PCT Pub. Date: May 20, 2021

(65) Prior Publication Data
US 2022/0363240 A1 Nov. 17, 2022

(30) Foreign Application Priority Data
Nov. 14, 2019 (FR) ...................... 1912694

(51) Int. Cl.
*B60W 20/19* (2016.01)
*B60W 10/06* (2006.01)
*B60W 30/188* (2012.01)

(52) U.S. Cl.
CPC ............ *B60W 20/19* (2016.01); *B60W 10/06* (2013.01); *B60W 30/1882* (2013.01);
(Continued)

(58) Field of Classification Search
CPC .. B60W 20/19; B60W 10/06; B60W 30/1882; B60W 2510/0614;
(Continued)

(56) References Cited

U.S. PATENT DOCUMENTS 6,823,840 B1 11/2004 Tamai et al.
8,418,675 B2 * 4/2013 Hernier ............... F02D 41/3836
123/457

(Continued)

FOREIGN PATENT DOCUMENTS

CN  101889135 A  11/2010
CN  104520561 A  4/2015
(Continued)

OTHER PUBLICATIONS

International Search Report and Written Opinion of the ISA for PCT/EP2020/081514 dated Feb. 11, 2021, 12 pages.
(Continued)

*Primary Examiner* — Tarek Elarabi
(74) *Attorney, Agent, or Firm* — NIXON & VANDERHYE (57) ABSTRACT

Disclosed is a method for optimizing the time gradient of the pressure increase in a fuel injection system of a hybrid motor vehicle. The method determines and uses the engine torque generated by the electric machine of the vehicle to reduce the engine torque generated by the internal combustion engine of the vehicle and allow the high-pressure pump of the internal combustion engine to generate, if applicable, a higher value of the time gradient of the pressure increase in the common supply chamber of its injection system.

20 Claims, 4 Drawing Sheets

(52) U.S. Cl.
CPC ............... *B60W 2510/0614* (2013.01); *B60W 2510/0657* (2013.01); *B60W 2530/13* (2021.08); *B60W 2710/0627* (2013.01)

(58) Field of Classification Search
CPC ..... B60W 2510/0657; B60W 2530/13; B60W 2710/0627
See application file for complete search history.

(56) References Cited

U.S. PATENT DOCUMENTS

| | | | |
|---|---|---|---|
| 9,126,591 | B2 | 9/2015 | Johri et al. |
| 9,481,353 | B2 | 11/2016 | Telborn |
| 9,651,535 | B2 | 5/2017 | Christensen |
| 10,232,841 | B2 | 3/2019 | Doering et al. |
| 10,352,266 | B2 | 7/2019 | Kurtz et al. |
| 2010/0229831 | A1* | 9/2010 | Hernier ............... F02D 41/3836 123/458 |
| 2018/0328307 | A1 | 11/2018 | Kurtz et al. |

FOREIGN PATENT DOCUMENTS

| | | |
|---|---|---|
| CN | 104554234 A | 4/2015 |
| CN | 104919163 A | 9/2015 |
| CN | 108071497 A | 5/2018 |
| CN | 108869079 A | 11/2018 |
| DE | 10 2007 058 539 | 6/2009 |
| EP | 3 326 880 | 5/2018 |
| FR | 3 001 771 | 8/2014 |

OTHER PUBLICATIONS

Office Action issued in Chinese Patent Application No. 202080078900.1 dated Oct. 30, 2023.

* cited by examiner

METHOD FOR OPTIMISING THE TIME GRADIENT OF THE PRESSURE INCREASE IN AN INJECTION SYSTEM OF A HYBRID MOTOR VEHICLE

CROSS-REFERENCE TO RELATED APPLICATIONS

This application is the U.S. national phase of International Application No. PCT/EP2020/081514 filed Nov. 9, 2020 which designated the U.S. and claims priority to French Patent Application No. 1912694 filed Nov. 14, 2019, the entire contents of each of which are hereby incorporated by reference.

BACKGROUND OF THE INVENTION

Field of the Invention

The present invention generally relates to injection systems of internal combustion engines of hybrid motor vehicles. It relates more particularly to a method for optimizing the time gradient of the pressure increase in the injection system of such a motor vehicle. The invention can be applied in particular in diesel hybrid motor vehicles in which the injection system of the diesel engine comprises a common supply chamber that supplies all of the fuel injectors with pressurized fuel.

Description of the Related Art

Hybrid motor vehicles are becoming increasingly popular due to the energy savings that they allow compared to motor vehicles provided with an internal combustion engine only. In particular, in such hybrid vehicles, an electric machine can contribute to generating the engine torque used to drive the vehicle, in addition to the internal combustion engine. This configuration therefore makes it possible to reduce the fuel consumption of the vehicle and, as a result, reduce the pollution generated by said vehicle when it is operating. It can be particularly usefully applied in motor vehicles (hybrid or otherwise) provided with a direct-injection internal combustion engine, whether this be the injection of gasoline (i.e. so-called "controlled-ignition engines") or the injection of diesel (i.e. so-called "diesel engines"). In both cases, the engine includes a direct injection system with a common supply chamber, and its operation is known for resulting in the emission of polluting discharges in the form of gas and/or fine particles, the reduction of which is sought.

The common supply chamber, also known as a common rail, is a closed chamber that constitutes a buffer space in which the fuel drawn from the tank of the vehicle, pressurized by a high-pressure pump of the injection system, is temporarily stored. In addition, when such an internal combustion engine is operating, the common supply chamber fills with pressurized fuel supplied by the high-pressure pump and empties each time one of the injectors of the injection system opens, in a cycle. In this case, the chamber acts as a buffer space, damping the pressure fluctuations linked to the different injection events. Finally, the pressurized fuel drawn from the chamber is therefore sprayed, by one or more injectors in turn, into a combustion chamber, where the thermal energy is converted into mechanical energy, that is, the engine torque is generated.

In concrete terms, when the driver of such a motor vehicle requests a predetermined engine torque, in the form of an acceleration command, a computer of the motor vehicle determines the combustion parameters suitable for the internal combustion engine to generate the required engine torque. In particular, the computer determines the quantity of fuel to be injected as a function of both time and the fuel pressure in the combustion chamber necessary for optimum operation of the fuel injection system. The computer can then control the high-pressure pump and the injectors of the injection system as a function of the values determined in this way.

In addition, on acceleration, the high-pressure pump must supply a fuel flow rate to the common supply chamber that is suitable for both allowing the injection of the required quantity of fuel as a function of time and allowing the pressure increase of the fuel, in the supply chamber, according to a desired time gradient. Although the engine torque that such an internal combustion engine can generate, in particular a diesel engine, essentially depends in a linear manner on the quantity of fuel injected as a function of time, the speed at which the pressure increase takes place in the common supply chamber has a significant impact on the performance of the injection system on acceleration. In particular, it is known that if the time gradient of the pressure increase of the fuel in the common supply chamber is not steep enough with regard to a given acceleration command, the injection system tends to emit polluting smoke. In other words, too slow a pressure increase in the common fuel supply chamber of the injection system results in an increase in polluting emissions.

The approaches envisaged until now to increase the time gradient of the pressure increase in the common supply chamber involve one or more modifications to the injection system. For example, one of these known approaches consists of using a larger capacity high-pressure pump that is therefore capable of increasing the fuel pressure more quickly. Another approach consists of reducing the volume of the common supply chamber and, as a result, allowing a faster pressure increase for an equivalent flow rate generated by the high-pressure pump. A further approach consists of limiting the conditions in which the equipment of the injection system, and in particular the high-pressure pump, can be used. The performance of the high-pressure pump, and therefore the maximum pressure increase time gradient that it is capable of generating, are linked to these conditions. Typically, the temperature or operating time of the pump since it was installed influence its performance. In other words, limiting the operating conditions of the high-pressure pump makes it possible to achieve a given performance level, and therefore generate the desired pressure increase time gradient. Finally, a last known approach consists of modifying the ratio of the drive system of the pump. This approach relates in particular to a pump driven by a belt or chain, in the context, for example, of equipment driven by an accessory belt. Modifying the size ratio between the shaft driving the belt and the shaft that allows the operation of the pump results in a higher operating speed of the pump and therefore a pressure increase gradient that is also steeper.

All of the approaches described above have drawbacks linked, in particular, to the fact that they involve modifying the injection system. For example, in addition to increasing the cost of the equipment, increasing the capacity of the pump results in the modification of the timing of the internal combustion engine so that higher torque can be transmitted to the pump. In addition, the maximum engine torque that the engine can generate can then exceed an achievable or desirable limit value. In another example, reducing the volume of the common supply chamber reduces its capability to act as a buffer space. In other words, the pressure in the common supply chamber can fall too quickly following an injection request, which can have a detrimental effect on the performance of the system as a whole. In any event, the modifications to the injection system required by these approaches limit or reduce its performance and introduce additional costs compared to a standard injection system.

SUMMARY OF THE INVENTION

The invention aims to overcome the aforementioned drawbacks of the prior art by proposing a method that makes it possible to increase the pressure increase time gradient that can be achieved in a common supply chamber of the internal combustion engine, for example a diesel engine, of a hybrid vehicle, without involving any modification of the fuel injection system itself. To this end, the method uses the mechanical energy generated by the electric machine of the hybrid motor vehicle to reduce the mechanical energy that the internal combustion engine must produce in order to generate a predetermined engine torque in response to a given acceleration command. By reducing the quantity of fuel that must be injected to produce the predetermined engine torque, this makes it possible to increase the gradient of the pressure increase in the common supply chamber. In addition, the application of the method does not involve high costs and makes it possible to retain an injection system with consistent performance.

To this end, a first aspect of the invention proposes a method for optimizing the time gradient of the pressure increase in a fuel injection system of a hybrid motor vehicle, said hybrid motor vehicle comprising an internal combustion engine and an electric machine suitable for each generating a predetermined engine torque, said internal combustion engine comprising an injection system with a high-pressure pump, a supply circuit, a common chamber for supplying pressurized fuel and a plurality of injectors supplied with the pressurized fuel in the common chamber, said method comprising the following steps, executed by a control unit of the hybrid motor vehicle in response to a first time gradient setpoint of the pressure increase of the fuel in the common fuel supply chamber representative of a predetermined acceleration request of the vehicle:
a) comparing the time gradient setpoint with a predetermined threshold value corresponding to the theoretical maximum capability to generate a pressure increase time gradient by action of the internal combustion engine on the high-pressure pump,
and, if the first time gradient setpoint is greater than the predetermined threshold value,
b) determining an additional engine torque value to be generated by the electric machine to allow the high-pressure pump to generate a pressure increase time gradient according to the first time gradient setpoint by action of the internal combustion engine on the high-pressure pump;
c) determining a first engine torque setpoint, for controlling the electric machine, on the basis of a maximum engine torque value that said electric machine can produce and the additional engine torque value;
d) transmitting an engine torque request to a control unit of the electric machine on the basis of the first engine torque setpoint;
e) determining a second engine torque setpoint, for controlling the internal combustion engine, on the basis of the required engine torque associated with the predetermined acceleration command, and the first engine torque setpoint;
f) determining combustion parameters suitable for causing the generation by the internal combustion engine of engine torque on the basis of the second engine torque setpoint;
g) determining an available pressure increase time gradient value associated with the second engine torque setpoint; and
h) determining a second pressure increase time gradient setpoint on the basis of the available pressure increase time gradient value, a maximum theoretical pressure increase time gradient value, and the first pressure increase time gradient setpoint.

Embodiments taken individually or in combination further provide that:
the internal combustion engine of the hybrid motor vehicle can be a diesel engine;
the hybrid motor vehicle can use a P0 architecture;
the electric machine can have a mild hybrid 48V configuration;
the predetermined threshold value corresponding to the theoretical maximum capability to generate a pressure increase time gradient using the high-pressure pump can be a function of operating parameters of the injection system such as, preferably, the temperature of the fuel in the injection system and the mileage of the vehicle since the high-pressure pump was installed;
the first engine torque setpoint, determined in step c), can be equal to the minimum of the maximum engine torque value that the electric machine can produce and the additional engine torque value;
the second engine torque setpoint, determined in step e), can be equal to the difference between the required engine torque value associated with the predetermined acceleration command and the first engine torque setpoint; and/or
the second pressure increase time gradient setpoint, determined in step h), can be equal to the minimum of the available pressure increase time gradient value, the maximum theoretical pressure increase time gradient value and the first pressure increase time gradient setpoint.

In a second aspect, the invention also relates to a computer for managing an engine of a hybrid motor vehicle comprising suitable means for executing all of the steps of the method according to the first aspect above.

In a third aspect, the invention also relates to a fuel injection system for a hybrid motor vehicle, said hybrid motor vehicle comprising an internal combustion engine and an electric machine each suitable for generating a predetermined engine torque, said injection system comprising a high-pressure pump, a supply circuit, a common supply chamber, a plurality of injectors supplied with the pressurized fuel in the common chamber, and a control unit comprising suitable means for executing all of the steps of the method according to the first aspect above.

BRIEF DESCRIPTION OF THE DRAWINGS

Other features and advantages of the invention will become more apparent on reading the following description. This description is purely illustrative and must be read with reference to the attached drawings, in which.

DESCRIPTION OF THE PREFERRED EMBODIMENTS

In the following description of embodiments and in the figures of the attached drawings, the same elements or similar elements bear the same reference numbers in the drawings.

Figure 1:
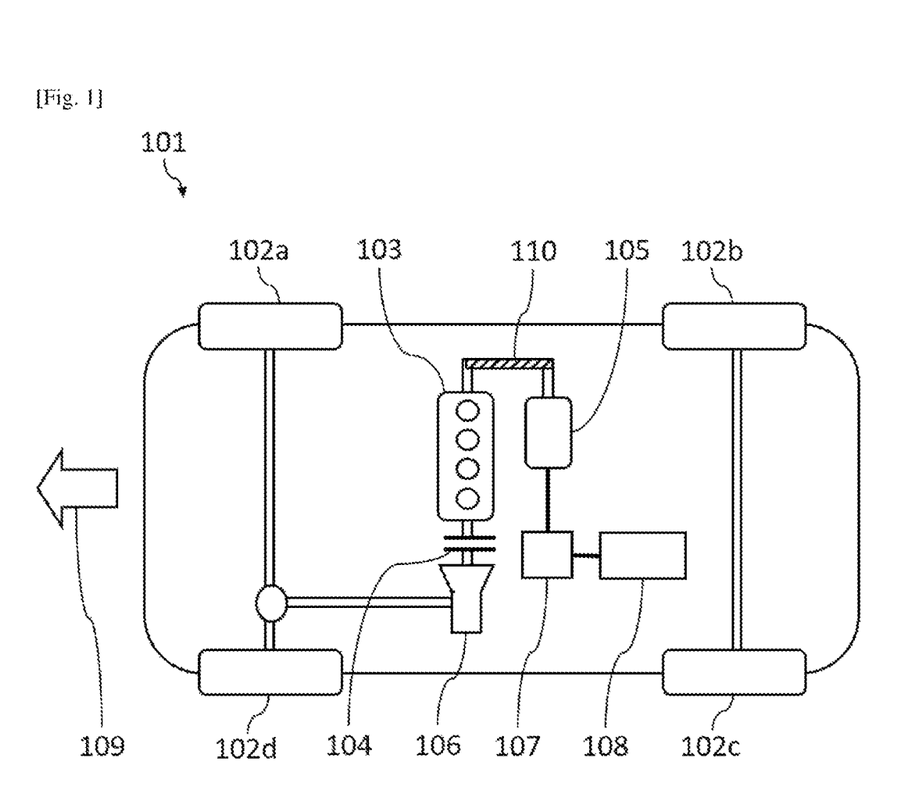
FIG. 1 is a schematic depiction of a hybrid motor vehicle in which the method according to the invention can be implemented.

FIG. 1 shows a schematic depiction of a hybrid motor vehicle in which the method according to the invention can be implemented. Such a hybrid motor vehicle is as found in the prior art and does not require any modification to enable the application of the method according to the invention.

In the example shown, the internal combustion engine 103 and the electric machine 105 are suitable for generating engine torque that makes it possible to set the hybrid motor vehicle 101 in motion. In particular, the engine torque generated makes it possible to rotate the front wheels 102a and 102d of the hybrid motor vehicle 101 by means of the clutch and the transmission 106, inter alia. The forward direction of travel of the vehicle is shown by the arrow 109. The internal combustion engine and electric machine assembly can be used in different configurations. For example, in a particular configuration, the electric machine can be used in motor mode to generate alone the engine drive torque of the vehicle that makes it possible to drive the wheels. In another configuration, the electric machine can be used in alternator mode to charge the battery 108 by means of an electronic power system 107 using some of the mechanical energy produced by the internal combustion engine. In a further configuration, it can be used in current generator mode to recover some of the kinetic energy of the vehicle during a braking phase of the vehicle, by generating resistive torque applied directly to the transmission or indirectly to the crankshaft of the internal combustion engine.

In a particular embodiment, the internal combustion engine is a diesel engine. However, a person skilled in the art will appreciate that the invention also applies to a gasoline engine provided that the direct fuel injection system of said internal combustion engine is as described below with reference to FIG. 2.

In a manner known per se to a person skilled in the art, there are several types of architecture of the assembly formed by the internal combustion engine and the electric machine. Conventionally, these architectures are denoted P0 to P5 depending on the exact position of the electric machine in the drive train of the vehicle or in the kinetic chain(s) driving the various accessories of the engine. In addition, in the particular embodiment shown in FIG. 1, the hybrid motor vehicle uses the P0 architecture. In this architecture, the electric machine 105 is connected to the internal combustion engine 103 by means of the accessory belt 110. Advantageously, this architecture allows easy and low-cost incorporation of the electric machine into a motor vehicle. In particular, this incorporation results in very few modifications compared to the conventional architecture of a motor vehicle with an internal combustion engine as the electric machine can simply replace the alternator on the accessory belt.

In addition, in a particular embodiment, the electric machine has a mild hybrid 48V configuration. In such a configuration, the electric machine is installed according to a P0 architecture. It is a 48-volt starter generator that can be used to charge the battery and supply engine torque up to several tens of kW, depending on its control mode. Advantageously, this configuration is very cost-effective and involves very simple assembly.

Figure 2:
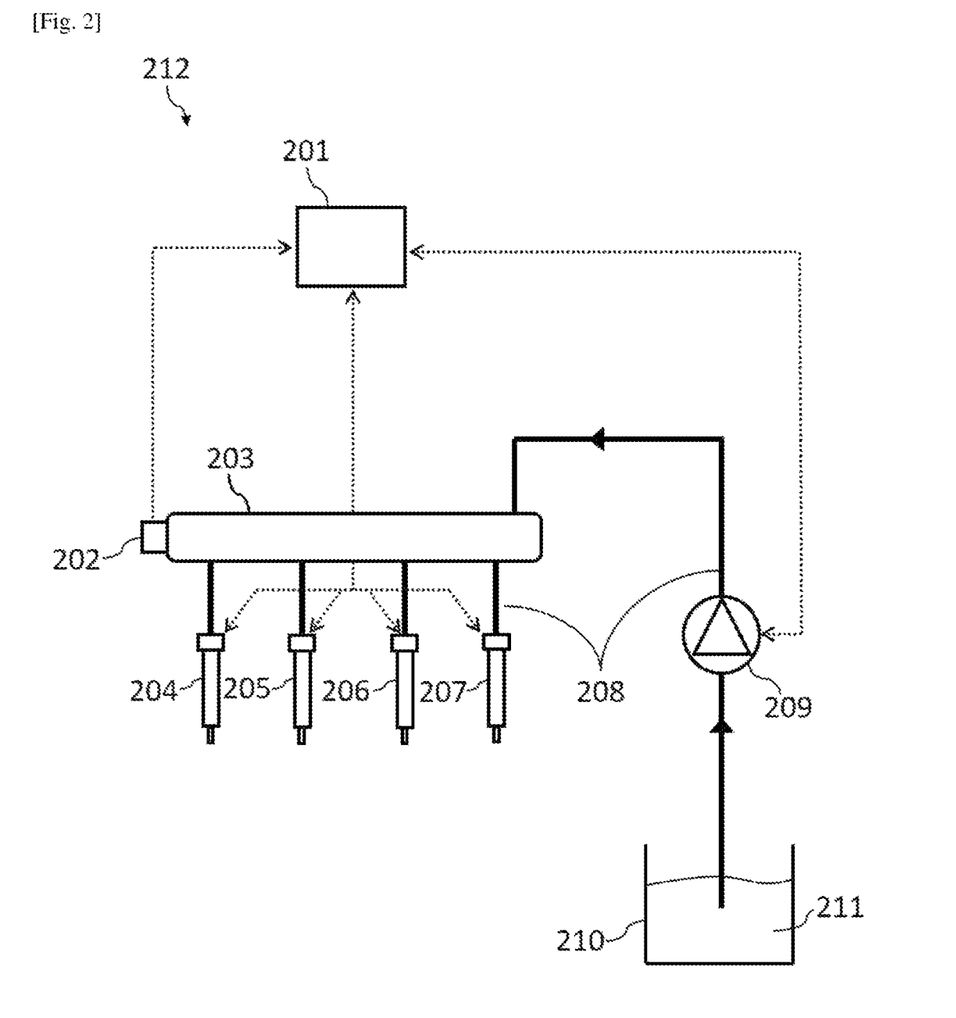
FIG. 2 is a schematic depiction of one embodiment of an injection system of an internal combustion engine of a hybrid motor vehicle in which the method according to the invention can be implemented.

FIG. 2 shows a schematic depiction of one embodiment of an injection system of an internal combustion engine of a hybrid motor vehicle in which the method according to the invention can be implemented. Advantageously, the fuel injection system 212 shown is, from a structural point of view, as found in the prior art. In other words, the implementation of the method of the invention does not require any modification of the injection system, as a person skilled in the art will appreciate.

In the example shown, the fuel 211, drawn from the tank 210, is pressurized a high-pressure pump 209. The high-pressure fuel flows through a supply circuit 208. A common supply chamber 202, also referred to as a common rail, stores the pressurized fuel and supplies all of the injectors 204, 205, 206 and 207 of the engine with pressurized fuel. A person skilled in the art will appreciate that the number of injectors in such a system is not necessarily limited to four as in the example shown, but can be equal to any number suitable for allowing correct operation of an internal combustion engine provided with the injection system in question, particularly depending on the number of engine cylinders (combustion chambers).

Additionally, a pressure sensor 202 allows measurement of the pressure of the fluid inside the common supply chamber 208. Finally, the control unit 201 operates the entire injection system by commanding the pump and the injectors in particular.

In addition, the control unit 201 is suitable for executing the steps of the method according to embodiments of the invention that will be described below with reference to FIG. 3. For example, in one particular embodiment, the control unit 201 is an engine management computer known as an ECU (engine control unit).

Figure 3:
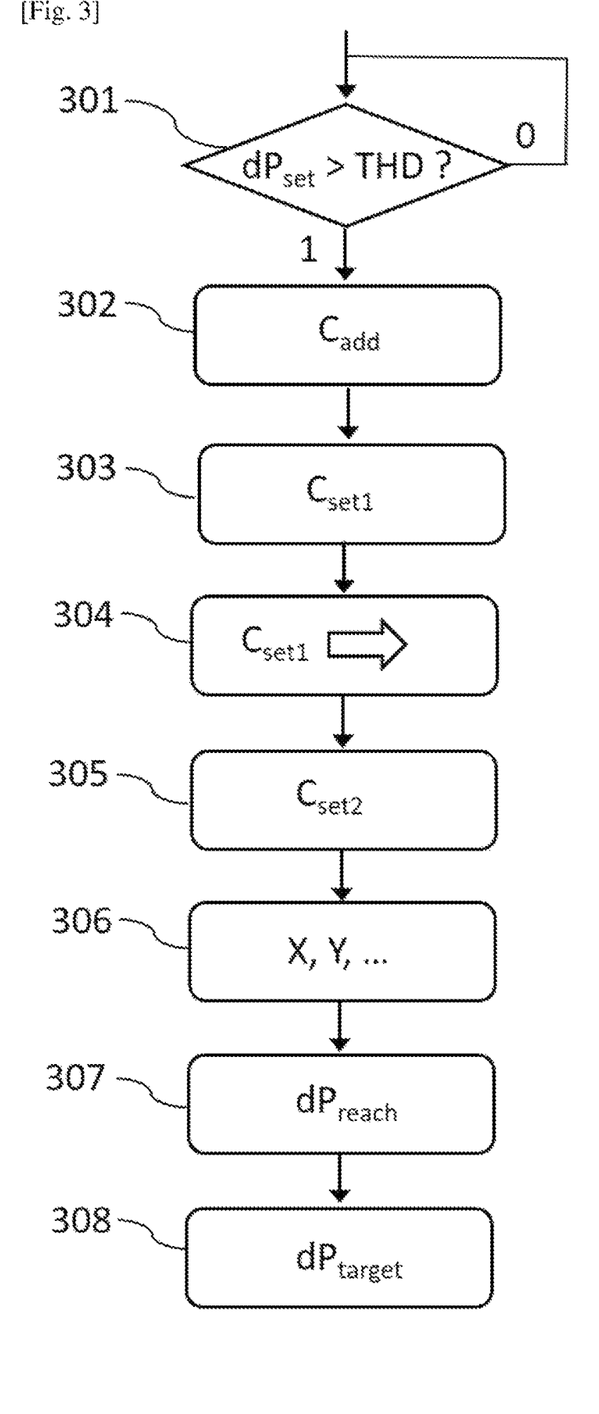
FIG. 3 is a diagram of steps of one embodiment of the method according to the invention.
Figure 4:
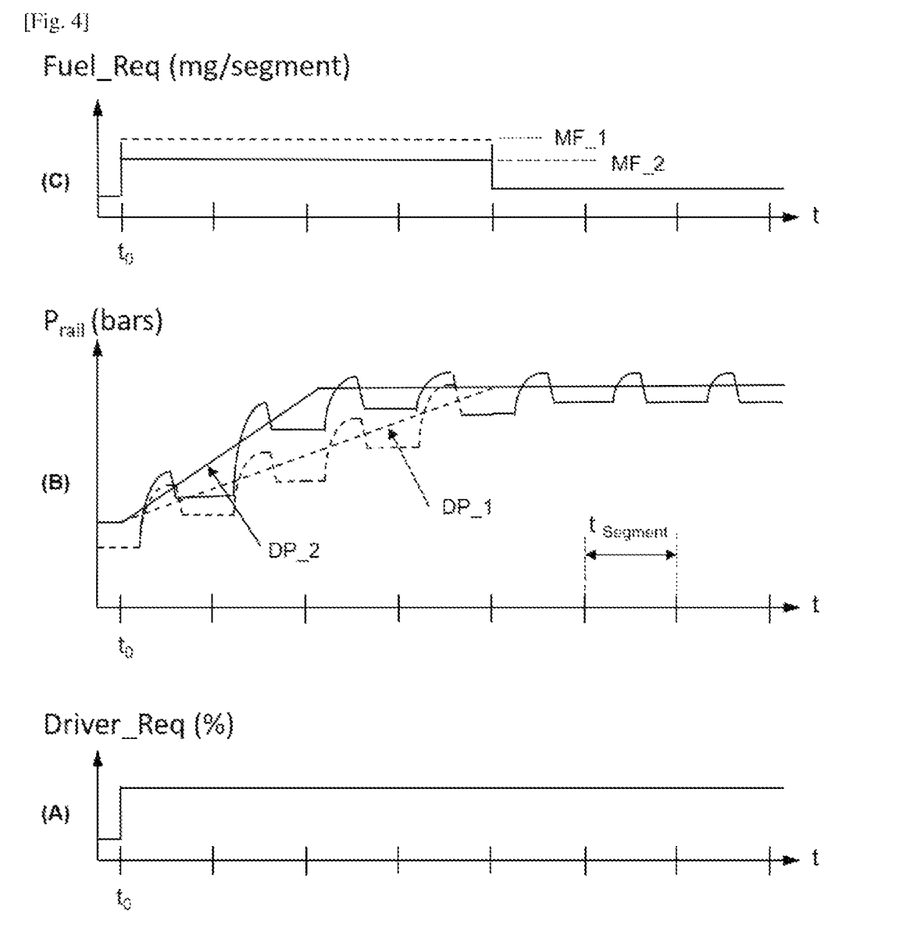
FIG. 4 is a graph illustrating the implementation of the method according to the invention.

FIG. 3 shows a diagram of steps of one embodiment of the method according to the invention. These steps are described below, also with reference, as necessary, to graphs (A), (B) and (C) in FIG. 4, in which:

graph (A) illustrates, as a function of time t, the request for acceleration of the vehicle made by the driver, for example via an accelerator pedal or any similar device such as a lever or a control button; this request by the driver is denoted "Driver_Req" in graph (A); it can for example be expressed as a percentage (%), with the zero value (0%) corresponding to the absence of an acceleration request (driver's foot lifted off the accelerator pedal), and the 100% value corresponding to a maximum acceleration request (driver's foot pressed fully down on the accelerator pedal), for example;

graph (B) illustrates the change in pressure "Prail" (for example in bar) in the common supply chamber; on this graph, the period between two injections of fuel into the common chamber is denoted tsegment, this period depending on the speed of the engine expressed in revolutions per minute (rpm); more particularly, the curve in dashed lines shows the change in pressure in the common supply chamber in the absence of the invention (that is, with the internal combustion engine only), while the curve in solid lines shows the change in pressure in the common supply chamber with the invention (that is, with both the internal combustion engine and the electric machine);

graph (C) illustrates the fuel injection request "Fuel_Req", as a function of time, in the common chamber; it can be expressed as a number of milligrams (mg) of fuel per injection segment; more particularly, the curve in dashed lines shows the change in the fuel injection request in the common supply chamber in the absence of the invention, while the curve in solid lines shows the change in the fuel injection request in the common supply chamber with the invention.

It will be remembered that the steps of the method are executed by a control unit of a hybrid motor vehicle, provided with a direct-injection internal combustion engine, which is for example a diesel engine, and with an electric machine as an electric drive motor or a starter generator.

The method is initiated by an action by the driver of the vehicle on the vehicle controls, generated during a predetermined driving phase. For example, at a given time t0, the driver presses the accelerator pedal more or less heavily to request more or less acceleration of the vehicle. This request by the driver "Driver_Req" is shown by graph (A) in FIG. 4. In addition, such an acceleration request is associated with both a required engine torque and a required pressure increase time gradient, which are predefined and can for example be read from a pre-recorded table of values stored, for example, in a memory of the control unit. The control unit can thus determine in real time the engine torque and pressure increase time gradient setpoints, respectively, that represent the acceleration request in question. For example, the pressure in the common supply chamber must reach approximately 200 bar when the internal combustion engine, a diesel engine in the example under consideration, is idling; and it can have to reach approximately 2,500 bar, when the internal combustion engine is fully loaded. A person skilled in the art will appreciate that, for a gasoline engine (i.e. a controlled-ignition engine), these values are lower. In any event, however, the actual pressure increase time gradient (i.e. actually seen) depends on the setpoints issued, but also on the intrinsic capabilities of the system to respond to these setpoints and particularly the limit of said intrinsic capabilities.

This is why step 301 of the method comprises comparing the time gradient setpoint associated with the predetermined acceleration command to a predetermined threshold value THD. This threshold THD corresponds for example to the theoretical maximum capability to generate a pressure increase time gradient using the high-pressure pump 209 under the action of the internal combustion engine 103 (via an accessory belt connecting the shaft of the high-pressure pump to the crankshaft of the internal combustion engine, for example). This step 301 makes it possible to check whether the injection system, particularly taking into account the intrinsic characteristics of the high-pressure pump 209, has sufficient capability to generate a pressure increase time gradient in accordance with the setpoint. The subsequent steps of the method are thus only executed if the setpoint of the pressure increase time gradient is greater than the predetermined threshold value (scenario "1" as illustrated in the diagram of steps in FIG. 3). If not (scenario "0" in FIG. 3), there is no need to implement the method, which is not therefore carried out. Symbolically, in FIG. 3 step 301 loops round on itself to illustrate this second scenario.

In addition, in a particular embodiment of the method, the predetermined threshold value THD corresponding to the theoretical maximum capability to generate a pressure increase time gradient using the high-pressure pump is a function of operating parameters of the injection system. These parameters comprise, for example, the temperature of the fuel in the injection system and the mileage of the vehicle since the high-pressure pump in service in the vehicle was installed, in order to take into account the changes in its operational characteristics as a function of aging. This gives better results on implementation of the method. In a manner known per se, the performance of the high-pressure pump varies as a function of these parameters. For example, the maximum pressure increase time gradient that the high-pressure pump can generate decreases over time with the progressive wear of said pump. A person skilled in the art will thus be able to adapt the threshold value THD to take into account the actual capability to generate a pressure increase time gradient using the high-pressure pump of the injection system at a given time.

Step 302 comprises determining an additional engine torque value to be generated by the electric machine, according to the principle that the torque provided by the electric machine will make it possible to reduce the torque requested of the internal combustion engine accordingly, and therefore the quantity of fuel "Fuel_Req" that must be injected to produce this engine torque; this fuel saving allows the high-pressure pump to generate a steeper pressure increase time gradient, which can comply with the time gradient setpoint, by combined action of the internal combustion engine and the electric machine on the high-pressure pump, despite the limit of the intrinsic capabilities of the injection system. In particular, the value determined in this way can be a function of the difference between the pressure increase time gradient setpoint and the threshold value THD reflecting the maximum time gradient value that the high-pressure pump can actually generate when it supplies the quantity of fuel "Fuel_Req" necessary to generate the required torque, through the action of the internal combustion engine only.

Graphs (B) and (C) in FIG. 4 illustrate the underlying technical effect.

Let us first consider the situation according to the prior art in which the internal combustion engine only is used to respond to the acceleration request Driver_Req shown by graph (A) of FIG. 4. The maximum pressure gradient DP_1 that the pump can supply corresponds to the slope of graph (B) in dashed lines (DP_1 is considered to correspond to the mean slope of this graph, i.e. the slope of a straight line, in order to smooth the effect of the respectively spaced injection times of the period tsegment that produce a certain variation in the value of the pressure Prail in the common supply chamber around said straight line).

In one example, DP_1 can be 1,500 bar/s, or 15 bar/segment at 3,000 rpm. The quantity of fuel that the pump must supply (in addition to providing the base injected quantity) to provide this gradient is given by the following expression:

$$DV\_1 = DP\_1 \times VolHP / Emodule, \text{ where:}$$

VolHP denotes the volume of the high-pressure circuit (common chamber and pipes), for example 20 ml; and
Emodule denotes the modulus of elasticity of the fuel in question, for example 29,123 bar for diesel at 2,000 bar at 40° C.

In the example considered here, DV_1=0.0103 ml.

Now let us consider the situation according to embodiments of the invention, in which not only the internal combustion engine but also the electric machine are used to respond to the acceleration request Driver_Req represented by graph (A) of FIG. 4. This combined use of the internal combustion engine and the electric machine makes it possible to achieve the desired pressure gradient DP_2, despite the limit of the intrinsic capabilities of the injection system.

In the example, DP_2 is 2,000 bar/s, or 20 bar/segment at 3,000 rpm. The quantity of fuel that the pump must supply to provide this gradient is given by the following expression:

DV_2=DP_2×VolHP/Emodule.

In the example considered here, DV_2=0.01373 ml.

In order to obtain this result, the invention proposes reducing the initial injected quantity MF_1 to a smaller quantity MF_2, as shown by graph (C) of FIG. 4. More particularly, the initial injected quantity MF_1 must be reduced by the quantity given by the following expression:

(DV_2−DV_1)×d, where:

d denotes the density of the fuel in question, for example d=907 mg/ml for diesel at 40° C.

In the example considered here:

MF_1=40 mg/segment; and

MF_2=MF_1−(0.01373−0.0103)×907 mg/ml=36.9 mg/segment.

The torque supplied by the internal combustion engine will be reduced given that, for example, for diesel, 1 mg supplies approximately 6 Nm. It is this torque reduction that is compensated for by the electric machine. In the example considered here, the replacement torque that the electric machine must thus supply is (40−36.9)×6=18.7 Nm.

In step 303, the control unit determines a first engine torque setpoint, for controlling the electric machine, on the basis of the maximum engine torque value that said electric machine can produce and the additional engine torque value. This value must then be used as a setpoint sent to the electric machine so that it produces engine torque that will allow the internal combustion engine to reduce the engine torque that it must generate while retaining a cumulative engine torque (from the internal combustion engine and the electric machine) that makes it possible to respond to the initial acceleration request.

It will be noted that, per se, calling on an electric machine to generate a contribution to a total engine torque that allows a reduction in the engine torque to be produced by the internal combustion engine, is known in the prior art. However, the invention is not limited thereto, as it consists of controlling the time gradient setpoint of the pressure increase in the common supply chamber, particularly by redefining this setpoint when the electric machine comes into action.

In addition, in a particular embodiment of the method, this first engine torque setpoint is equal to the minimum of the maximum engine torque value that the electric machine can produce and the additional engine torque value.

Step 304 comprises transmitting an engine torque request to a control unit of the electric machine that is equal to the first engine torque setpoint. It is this engine torque which, once added to an engine torque generated by the internal combustion engine, makes it possible to supply the required engine torque associated with the acceleration command from a driver of the hybrid motor vehicle. Advantageously, the share of engine torque that can be handled by the electric motor makes it possible to reduce the quantity of fuel that the injection system of the internal combustion engine must inject and, as a result, generate a steeper time gradient of the pressure increase in the common supply chamber. In addition, this share is determined taking into account the actual respective capabilities of the internal combustion engine and the electric machine.

Step 305 consists of determining a second engine torque setpoint on the basis of the required engine torque associated with the predetermined acceleration command, and the first engine torque setpoint. Insofar as the electric machine can generate some of the total engine torque, the second engine torque setpoint value determined in this way is lower than the engine torque setpoint associated with the predetermined acceleration command.

In particular, in a particular embodiment of the method, this second engine torque setpoint can be equal to the difference between the required engine torque value associated with the predetermined acceleration command and the first engine torque setpoint as defined in the example of the implementation of step 304 given above, that is, defined as the minimum of the maximum engine torque value that the electric machine can produce and the additional engine torque value. Other embodiments are however possible, in which the respective contributions to the total engine torque provided by the electric machine and the internal combustion engine can be weighted in different ways, as a function of the specific features of each application, which has the effect of reducing the quantity of pressurized fuel consumed from said chamber.

Step 306 consists of determining combustion parameters suitable for allowing the internal combustion engine to generate engine torque corresponding to the second engine torque setpoint value. For example, these combustion parameters are the quantity of fuel injected as a function of time, and the pressure in the common supply chamber. A person skilled in the art will be able to determine, on the basis of an engine torque setpoint value that the internal combustion engine must generate, the combustion parameters of the injection system that make it possible to generate said setpoint value.

Step 307 consists of determining an available pressure increase time gradient value associated with the second engine torque setpoint. Available is given to mean the maximum pressure increase time gradient that the internal combustion engine can generate taking into account the intrinsic capabilities of the internal combustion engine and the share of engine torque handled by the electric machine.

Finally, step 308 consists of determining a new pressure increase time gradient setpoint on the basis of the available pressure increase time gradient value determined in step 307 above, a maximum theoretical pressure increase time gradient value and the first pressure increase time gradient as determined initially. Finally, this new pressure increase time gradient setpoint replaces the first pressure increase time gradient setpoint initially associated with the acceleration command from the user of the hybrid motor vehicle, for controlling the internal combustion engine. It is therefore used, by the control unit, to control the internal combustion engine and obtain a pressure increase time gradient that is optimized taking into account the actual capabilities of the electric machine.

In particular, in one particular embodiment of the method, the second pressure increase time gradient setpoint is equal to the minimum of the available pressure increase time gradient value, the maximum theoretical pressure increase time gradient value, and the first pressure increase time gradient setpoint. The second pressure increase time gradient setpoint thus depends on whether or not the internal combustion engine alone can generate a time gradient in accordance with the time gradient required, and whether or not the electric machine can supplement the time gradient generated by the internal combustion engine to reach the first pressure increase time gradient setpoint.

In summary, advantageously, when the electric machine can generate sufficient engine torque to make it possible to reduce the engine torque generated by the internal combustion engine while reaching the required engine torque associated with the acceleration command, the pressure increase time gradient that the internal combustion engine can generate increases. In addition, this increase makes it possible to reach a value that guarantees optimum operation of the injection system and makes it possible to limit the toxic fumes emitted by the injection system during the acceleration phases of the hybrid motor vehicle.

In the claims, the term "comprise" or "include" does not exclude other elements or other steps. A single processor or a plurality of other units can be used to implement the invention. The various features presented and/or claimed can advantageously be combined. Their presence in the description or in different dependent claims does not exclude this possibility. The reference signs should not be understood as limiting the scope of the invention.

The invention claimed is:

1. A method for optimizing a pressure increase time gradient in a fuel injection system of a hybrid motor vehicle, said hybrid motor vehicle comprising an internal combustion engine and an electric machine, each suitable for generating a predetermined engine torque, said internal combustion engine comprising an injection system with a high-pressure pump, a supply circuit, a common chamber for supplying pressurized fuel and a plurality of injectors supplied with the pressurized fuel in the common chamber,
said method comprising the following steps, executed by a control unit of the hybrid motor vehicle in response to a first time gradient setpoint of the pressure increase of the fuel in the common fuel supply chamber representative of a predetermined acceleration request of the hybrid motor vehicle:
a) comparing the first time gradient setpoint with a predetermined threshold value (THD) corresponding to a theoretical maximum capability to generate a pressure increase time gradient by action of the internal combustion engine on the high-pressure pump;
and, if the first time gradient setpoint is greater than the predetermined threshold value;
b) determining an additional engine torque value to be generated by the electric machine to allow the high-pressure pump to generate a pressure increase time gradient according to the first time gradient setpoint by action of the internal combustion engine on the high-pressure pump;
c) determining a first engine torque setpoint, for controlling the electric machine, on the basis of a maximum engine torque value that said electric machine can produce and the additional engine torque value;
d) transmitting an engine torque request to a control unit of the electric machine on the basis of the first engine torque setpoint;
e) determining a second engine torque setpoint, for controlling the internal combustion engine, on the basis of the required engine torque associated with the predetermined acceleration command, and the first engine torque setpoint;
f) determining combustion parameters suitable for causing the generation of engine torque by the internal combustion engine on the basis of the second engine torque setpoint;
g) determining an available pressure increase time gradient value associated with the second engine torque setpoint; and
h) determining a second pressure increase time gradient setpoint on the basis of the available pressure increase time gradient value, a maximum theoretical pressure increase time gradient value, and the first pressure increase time gradient setpoint.

2. The method as claimed in claim 1, in which the internal combustion engine of the hybrid motor vehicle is a diesel engine.

3. The method as claimed in claim 2, in which the hybrid motor vehicle uses a P0 architecture.

4. The method as claimed in claim 2, in which the predetermined threshold value (THD) corresponding to the theoretical maximum capability to generate a pressure increase time gradient using the high-pressure pump is a function of operating parameters of the injection system.

5. The method as claimed in claim 2, in which the first engine torque setpoint, determined in step c), is equal to the minimum of the maximum engine torque value that the electric machine can produce and the additional engine torque.

6. The method as claimed in claim 1, in which the hybrid motor vehicle uses a P0 architecture.

7. The method as claimed in claim 6, in which the electric machine has a mild hybrid 48V configuration.

8. The method as claimed in claim 7, in which the predetermined threshold value (THD) corresponding to the theoretical maximum capability to generate a pressure increase time gradient using the high-pressure pump is a function of operating parameters of the injection system.

9. The method as claimed in claim 7, in which the first engine torque setpoint, determined in step c), is equal to the minimum of the maximum engine torque value that the electric machine can produce and the additional engine torque.

10. The method as claimed in claim 6, in which the predetermined threshold value (THD) corresponding to the theoretical maximum capability to generate a pressure increase time gradient using the high-pressure pump is a function of operating parameters of the injection system.

11. The method as claimed in claim 6, in which the first engine torque setpoint, determined in step c), is equal to the minimum of the maximum engine torque value that the electric machine can produce and the additional engine torque.

12. The method as claimed in claim 1, in which the predetermined threshold value (THD) corresponding to the theoretical maximum capability to generate a pressure increase time gradient using the high-pressure pump is a function of operating parameters of the injection system.

13. The method of claim 12, wherein the operating parameters of the injection system comprise fuel temperature in the injection system.

14. The method of claim 13, wherein the operating parameters of the injection system further comprise the hybrid motor vehicle mileage since the high-pressure pump was installed.

15. The method as claimed in claim 12, in which the first engine torque setpoint, determined in step c), is equal to the minimum of the maximum engine torque value that the electric machine can produce and the additional engine torque.

16. The method as claimed in claim 1, in which the first engine torque setpoint, determined in step c), is equal to the minimum of the maximum engine torque value that the electric machine can produce and the additional engine torque.

17. The method as claimed in claim 1, in which the second engine torque setpoint, determined in step e), is equal to the difference between the required engine torque value associated with the predetermined acceleration command and the first engine torque setpoint.

18. The method as claimed in claim 1, in which the second pressure increase time gradient setpoint, determined in step h), is equal to the minimum of the available pressure increase time gradient value, the maximum theoretical pressure increase time gradient value and the first pressure increase time gradient setpoint.

19. A computer for managing an engine of a hybrid motor vehicle comprising suitable means for executing all of the steps of the method as claimed in claim 1.

20. A system for optimizing the pressure increases time gradient in the fuel injection system of the hybrid motor vehicle comprising suitable means for executing all of the steps of the method as claimed in claim 1.

* * * * *